United States Patent
Yamamoto (10) Patent No.: US 7,808,516 B2
(45) Date of Patent: Oct. 5, 2010

(54) IMAGE FORMING APPARATUS

(75) Inventor: Ryuji Yamamoto, Ashigarakami-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 246 days.

(21) Appl. No.: 12/031,398

(22) Filed: Feb. 14, 2008

(65) Prior Publication Data
US 2008/0292341 A1 Nov. 27, 2008

(30) Foreign Application Priority Data
Feb. 23, 2007 (JP) .............................. 2007-044004
Dec. 19, 2007 (JP) .............................. 2007-327408

(51) Int. Cl.
*G03G 15/043* (2006.01)
(52) U.S. Cl. ...................... 347/132; 347/247
(58) Field of Classification Search ................. 347/111, 347/112, 129, 132, 224, 225, 237, 247, 251
See application file for complete search history.

(56) References Cited
U.S. PATENT DOCUMENTS

| | | | |
|---|---|---|---|
| 5,311,262 A | 5/1994 | Shimizu et al. | |
| 5,669,050 A | 9/1997 | Sakemi et al. | |
| 6,285,841 B1 | 9/2001 | Miho | |
| 6,480,212 B1 * | 11/2002 | Shimoda et al. | 347/129 |
| 6,573,920 B2 * | 6/2003 | Shimoda et al. | 347/129 |
| 7,528,859 B2 * | 5/2009 | Yokoyama et al. | 347/262 |
| 2008/0131165 A1 * | 6/2008 | Yokoyama et al. | 399/159 |
| 2008/0131166 A1 * | 6/2008 | Yokoyama et al. | 399/159 |

FOREIGN PATENT DOCUMENTS

| | | |
|---|---|---|
| JP | 6-060181 A | 3/1994 |
| JP | 10-171238 A | 6/1998 |

* cited by examiner

*Primary Examiner*—Huan H Tran
(74) *Attorney, Agent, or Firm*—Canon U.S.A., Inc. I.P. Division (57) ABSTRACT

An image forming apparatus includes a photosensitive drum, a charging apparatus arranged to charge the photosensitive drum, and a developing apparatus arranged to supply toner to an electrostatic latent image in a development region, thereby developing the electrostatic latent image to a toner image. The image forming apparatus further includes a laser unit, an LED array unit which is located downstream of the laser unit in a moving direction of the photosensitive drum and is disposed inside the photosensitive drum to be able to perform exposure within the development region, and a control unit configured to control the laser unit and the LED array unit such that the LED array unit is able to expose the same area on the photosensitive drum which has been exposed by the laser unit.

1 Claim, 11 Drawing Sheets

IMAGE FORMING APPARATUS

BACKGROUND OF THE INVENTION

1. Field of the Invention

The present invention relates to an image forming apparatus, such as a printer, a copying machine and a facsimile, which utilizes an electrophotographic process or an electrostatic recording process.

2. Description of the Related Art

In a known electrophotographic image forming apparatus such as a copying machine and a printer, an electrostatic latent image (also simply called a latent image) is formed by exposing an electrophotographic photosensitive member (also simply called a photosensitive member), which has been charged, by using an optical writing unit, e.g., a laser. Then, a developer bearing member in a developing apparatus causes a developer to adhere to the latent image so that the latent image is visualized as a developer image. The developer adhering to the photosensitive member is transferred to a recording medium, e.g., a sheet of paper, whereby an output image is formed.

Methods of developing the latent image to the developer image are mainly divided into a one-component development method and a two-component development method. The one-component development method uses, as a developer (developing agent), a one-component developer that is substantially made of only resin toner particles (toner). On the other hand, the two-component development method uses, as the developer, a two-component developer that is primarily made of resin toner particles (toner) and magnetic carrier particles (carrier).

Further, the one-component development method is divided into a contact development method of bringing a toner layer formed on a developer bearing member into contact with an image bearing member in a development region, to thereby develop the latent image, and a noncontact development method of holding the developer bearing member and the image bearing member in a noncontact relation and causing toner particles to fly from the developer bearing member toward the image bearing member, to thereby develop the latent image.

Figure 3:
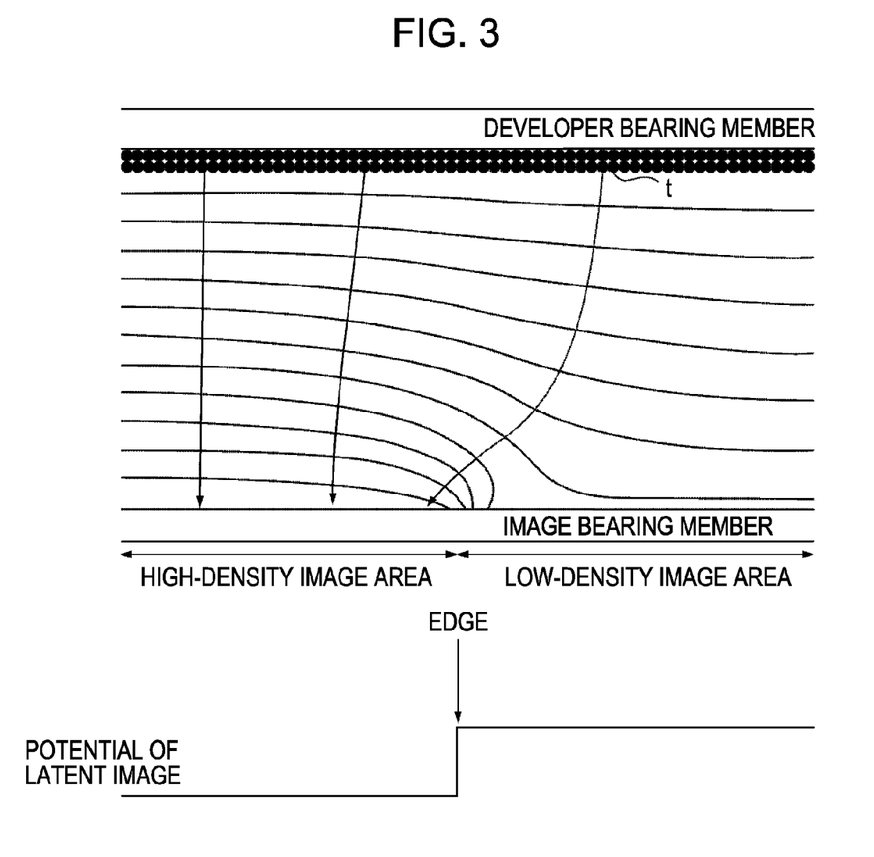
FIG. 3 is an enlarged explanatory view illustrating movements of toner in a development region in which a photosensitive member and a developer bearing member are positioned to face each other, when the noncontact development method is used.
Figure 6:
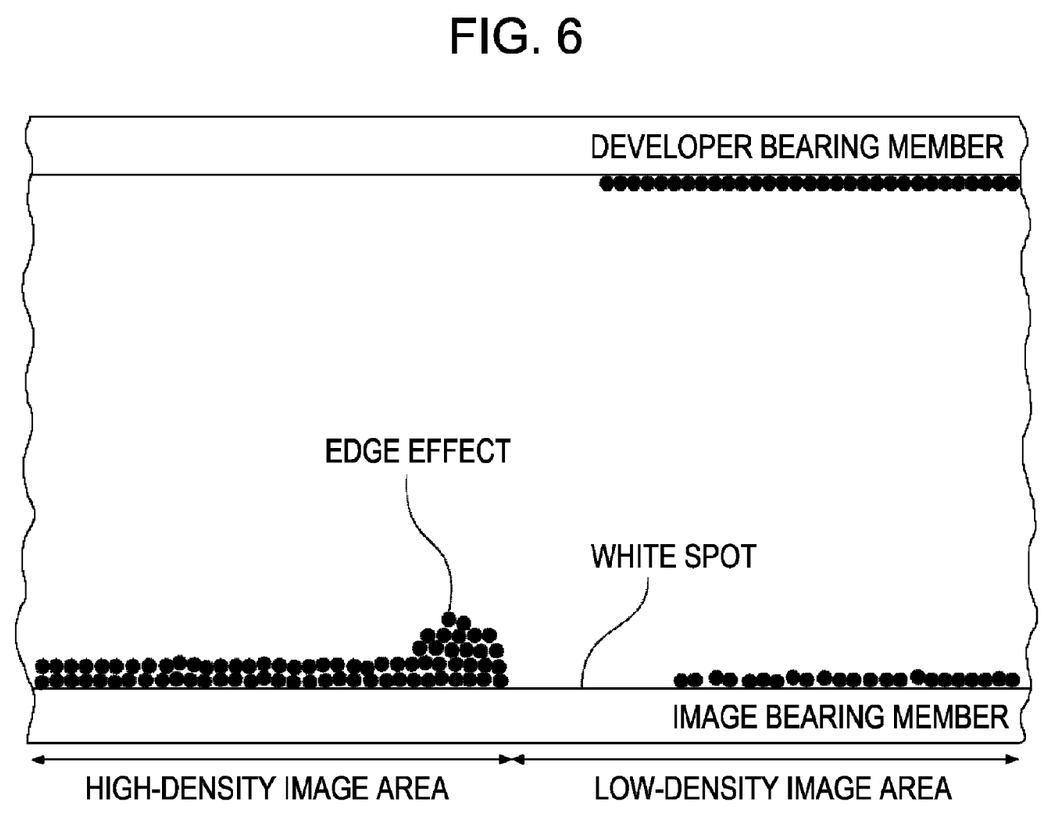
FIG. 6 is an explanatory view illustrating an edge effect and a white spot generated in the development region in which the photosensitive member and the developer bearing member are positioned to face each other, when the noncontact description method is used.

FIG. 3 is an enlarged explanatory view illustrating movements of toner in the development region in which the image bearing member and the developer bearing member are positioned to face each other, when the noncontact development method is used. In FIG. 3, at an edge where there is a gap in potential of the latent image on the image bearing member, toner (t) positioned on the developer bearing member opposing to the image bearing member near the edge is attracted toward a high-density image portion. As illustrated in FIG. 6, therefore, the amount of toner adhering to the high-density image portion near the edge is increased beyond the estimated amount. Consequently, the image density is too increased, or an area where the toner (t) adheres to the high-density image portion is too widened (such a phenomenon is referred to as an "edge effect" hereinafter).

Also, because the toner (t) having adhered to a low-density image portion adjacent to the high-density image portion is attracted toward the high-density image portion, the toner (t) is less apt to adhere to the low-density image portion, thus generating a white spot (or streak) (such a phenomenon is referred to as a "white spot" hereinafter).

The edge effect and the white spot are more noticeably generated with the noncontact development method. The mechanism for generation of the edge effect and the white spot will be described in more detail with reference to FIGS. 3 and 6.

In an air layer through which the toner having departed from the developer bearing member flies and adheres to the image bearing member, lines of electric force are generated in a region positioned above and spanning from the low-density image portion to the high-density image portion (FIG. 3). The lines of electric force act perpendicularly to equi-potential lines illustrated in FIG. 3. Because the toner (t) on an area of the developer bearing member opposing to the low-density image portion flies along the lines of electric force, the amount of toner adhering to the high-density image portion near the edge is increased beyond the amount estimated from the potential of the latent image (FIG. 6). On the other hand, the amount of toner adhering to the low-density image portion near the edge is reduced beyond the amount estimated from the potential of the latent image.

More specifically, when an AC continuous wave is applied to the developer bearing member, the direction of an electric field generated by an AC voltage is changed per half cycle and the direction of movement of the toner (t) is also changed per half cycle. Therefore, the toner flying speed is attenuated near a point where the direction of movement of the toner (t) is changed, so that the toner (t) is more apt to move along the lines of electric force illustrated in FIG. 3. As a result, the amount of toner adhering to the high-density image portion near the edge is increased and the edge effect is generated. With the generation of the edge effect, the amount of toner adhering to the low-density image portion near the edge is reduced and the white spot is generated.

Another cause of the edge effect and the white spot resides in that, even with the toner (t) flying toward the low-density image portion of the image bearing member, the toner (t) repeats bounding on the image bearing member and is finally settled onto the high-density image portion.

The edge effect and the white spot are not generated in ideal development (i.e., development with charging efficiency of 100%) in which the potential difference between the high-density image portion and the low-density image portion is completely canceled with adhesion of the toner in a developing step. The reason is that, even when the edge effect and the white spot are generated through the above-described process during the developing step, the lines of electric force acting in the direction to generate the edge effect and the white spot are weakened with the progress of the development and a development result is finally obtained as per the potential of the latent image. In an ordinary system, however, the charging efficiency in the developing step is not sufficient and the developing step is ended while the potential difference between the high-density image portion and the low-density image portion remains to some extent. Hence the edge effect and the white spot also remain at the time of end of the development.

Further, in the noncontact development method, because a developer layer on the developer bearing member and a surface of the image bearing member are maintained in a noncontact state, a distance (gap) between the developer bearing member and the image bearing member is required to be set larger than that in the contact development method. With the setting of the larger distance, the lines of electric force are curved to a larger extent, thus making the edge effect and the white spot more noticeable.

The edge effect and the white spot are also generated in the case of contact development, though not so noticeable as in the case of noncontact development.

Aiming to avoid the edge effect and the white spot, there is a known technique (U.S. Pat. No. 5,311,262) for specifying conditions of magnetic poles in a magnetic developing apparatus. However, the known technique cannot be applied to a nonmagnetic developing apparatus, and it requires the magnetic poles to be designed in complicated arrangement.

Other known proposals include a method of inspecting the degree of development at the edge by using a patch and making correction with image processing (Japanese Patent Laid-Open No. 6-60181) and a method of correcting the directions of the lines of electric force by forming irregularities on a developer bearing member (Japanese Patent Laid-Open No. 10-171238). However, those known methods require complicated arrangements and increase the cost when practiced.

As another solution, there is known a method of using an AC waveform having blank portions as a bias voltage applied to the developer bearing member. Such an AC waveform is called a blank pulse waveform obtained by modifying a bias waveform of an AC voltage superimposed with a DC waveform such that an AC component is intermittently paused to provide blank portions and only a DC component is applied in the blank portions.

An example of the known development method using the blank pulse waveform as the bias voltage for the development is described in U.S. Pat. No. 5,669,050.

That known development method is advantageous in avoiding the edge effect and the white spot. In that known development method, however, the AC voltage acting to trigger release of the toner from the surface of the developer bearing member is not applied in the blank portions in which the application of the AC voltage is paused. This causes the problem that, in the blank portions, the amount of released toner is reduced and development performance (toner adhesion) is entirely deteriorated in comparison with continuous waveform portions other than the blank portions.

In view of the above-mentioned problem, a method of making the intermittently paused AC component asymmetrical is proposed which is advantageous in not only avoiding the edge effect and the white spot, but also preventing the deterioration of the development performance (see U.S. Pat. No. 6,285,841). Although the proposed method can prevent the deterioration of the development performance, it has the problem that stability in the development process is impaired due to the use of intermittent pulses and sharpness of an image is lost.

SUMMARY OF THE INVENTION

With the view of overcoming the problems described above, an exemplary embodiment of the present invention provides an image forming apparatus which can be applied to a magnetic developing apparatus and a nonmagnetic developing apparatus, which can suppress generation of the edge effect and the white spot.

According to one aspect of the present invention, an image forming apparatus comprises a photosensitive member having a movable surface, the photosensitive member including a photosensitive layer and an exposure apparatus which exposes the photosensitive layer to form an electrostatic latent image and includes light emitting portions arranged in a grid pattern, the photosensitive layer and the exposure apparatus being movable in union with the photosensitive member, the exposure apparatus forming the electrostatic latent image by setting an exposure time to be long for an area forming a high-density image portion and short for an area forming a low-density image portion. The image forming apparatus further comprises a charging apparatus arranged to charge a surface of the photosensitive member, a developing apparatus arranged to supply a developer to the electrostatic latent image in a development region, thereby developing the electrostatic latent image to a developer image, and a control unit configured to control the exposure apparatus such that, when a latent image is formed to obtain a developer image containing the high-density image portion and the low-density image portion, a position on the surface of the photosensitive member, at which exposure for the area forming the high-density image portion is completed, is located within the development region and downstream of a position on the surface of the photosensitive member, at which exposure for the area forming the low-density image portion is completed, in a moving direction of the surface of the photosensitive member.

With the image forming apparatus according to the one aspect of the present invention, application to a magnetic developing apparatus and a nonmagnetic developing apparatus can be practiced and the generation of the edge effect and the white spot can be suppressed.

Further features of the present invention will become apparent from the following description of exemplary embodiments with reference to the attached drawings.

DESCRIPTION OF THE EMBODIMENTS

Exemplary embodiments of the present invention will be described in detail below with reference to the drawings. It is to be noted that dimensions, materials and shapes of components described in the following exemplary embodiments, as well as relative positional relationships among the components should not be construed as limiting the scope of the invention to them unless otherwise specified.

First Exemplary Embodiment

Figure 1:
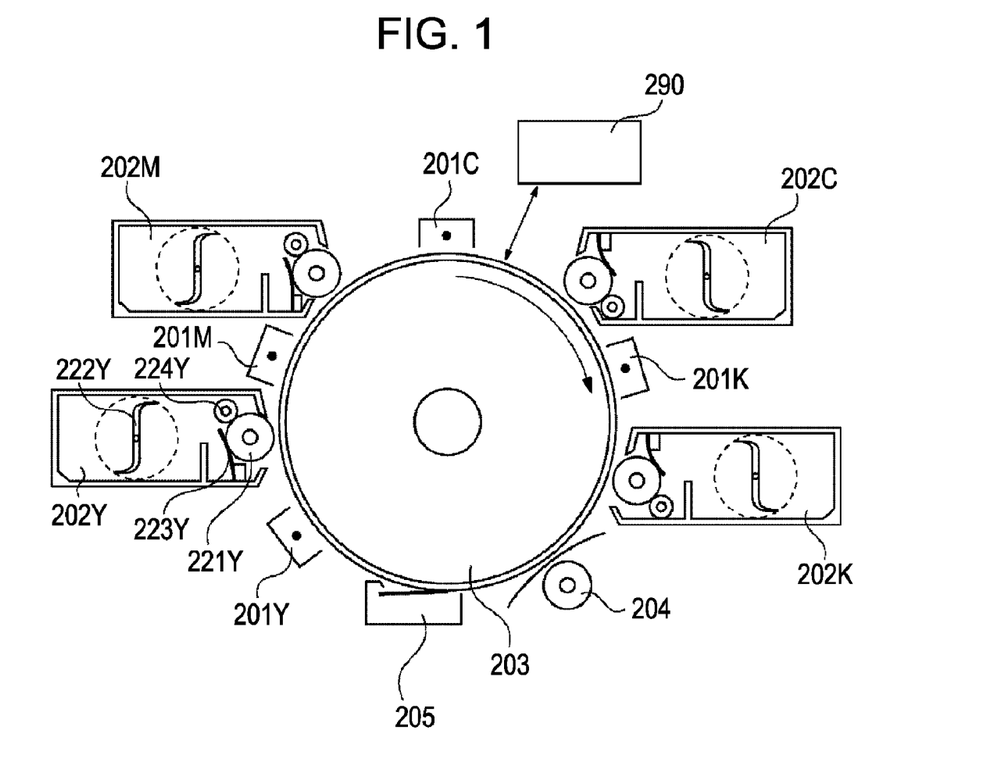
FIG. 1 is a schematic view illustrating principal components of an image forming apparatus according to a first exemplary embodiment of the present invention.

FIG. 1 is a schematic view illustrating principal components of an image forming apparatus according to a first exemplary embodiment in which the present invention is applied to an electrophotographic color printer. The color printer forms a hard copy in accordance with image data sent from various types of image data output apparatuses, such as an image data forming apparatus, an image storage apparatus, an image reading apparatus, an image processing apparatus, and an image display apparatus. Of course, features of embodiments of the present invention can also be applied to a monochrome printer in addition to the color printer.

(Overall Construction)

The printer of the first exemplary embodiment includes a digital photosensitive drum 203 which is a photosensitive member formed by coating, on a drum-shaped conductive base member, a self-luminous device portion (exposure apparatus) including light emitting elements (portions) arranged in a grid pattern. The self-luminous device portion (light emitting device) including the light emitting elements arranged in a grid pattern is able to perform digital exposure. The digital photosensitive drum 203 has a movable surface and is steadily rotated in the direction indicated by an arrow. With the rotation of the digital photosensitive drum 203, the self-luminous device portion and the photosensitive layer are also steadily rotated together.

The digital photosensitive drum 203 is uniformly charged by a charger 201Y capable of performing uniform charging. The chargers 201Y, 201M, 201C and 201K are each a scorotron charger that performs noncontact charging by utilizing corona discharge.

The uniformly charged digital photosensitive drum 203 is exposed by the self-luminous device portion (not shown in FIG. 1, see FIG. 2) that is incorporated inside the digital photosensitive drum 203, to thereby form an electrostatic latent image (simply called a latent image).

The latent image formed on the digital photosensitive drum 203 is visualized by a one-component developing apparatus 202Y containing yellow (Y) toner. Within the one-component developing apparatus 202Y, the Y toner is conveyed toward a development roller 221Y, which serves as a developer bearing member, with rotation of a stirring vane 222Y and is coated over the development roller 221Y by a blade 223Y. A gap of about 200 μm is held between the development roller 221Y and the digital photosensitive drum 203 at a position where they are located closest to each other. With application of a bias to the development roller 211Y, the toner is supplied to the latent image formed on the digital photosensitive drum 203 such that a toner image (developer image) is developed. The bias has a waveform prepared by superimposing, on a DC bias of −400 V, an AC bias with Vpp of 1.85 kV and frequency of 3.5 kHz. The toner remaining over the development roller 221Y after the development is recovered for reuse by a recovery roller 224Y.

Further, the digital photosensitive drum 203 having been subjected to the development by the Y toner is charged again by the charger 201M and is exposed again by the self-luminous device portion that is incorporated inside the digital photosensitive drum 203. A latent image formed by the exposure at this time is developed by magenta (M) toner, i.e., by a one-component developing apparatus 202M containing the M toner Similar development processes are successively performed by combination of a charger 201C and a one-component developing apparatus 202C containing cyan (C) toner and combination of a charger 201K and a one-component developing apparatus 202K containing black (K) toner. As a result, a full-color visualized image is formed on the digital photosensitive drum 203.

The full-dolor toner image formed on the digital photosensitive drum 203 is transferred onto paper by a transfer apparatus 204. The transfer apparatus 204 includes a transfer roller and a device for applying a bias to the transfer roller.

The toner image having been transferred onto the paper is fused and fixed to the paper by the action of heat and pressure that are applied by a fusing apparatus (not shown).

The toner remaining on the digital photosensitive drum 203 without being transferred to the paper is scraped off and recovered by a cleaning apparatus 205. All steps for printing are thus completed.

(Digital Photosensitive Drum)

The digital photosensitive drum 203 used in the first exemplary embodiment of the present invention will be described in more detail regarding the layer structure and the driving method.

(Layer Structure of Digital Photosensitive Drum)

Figure 2:
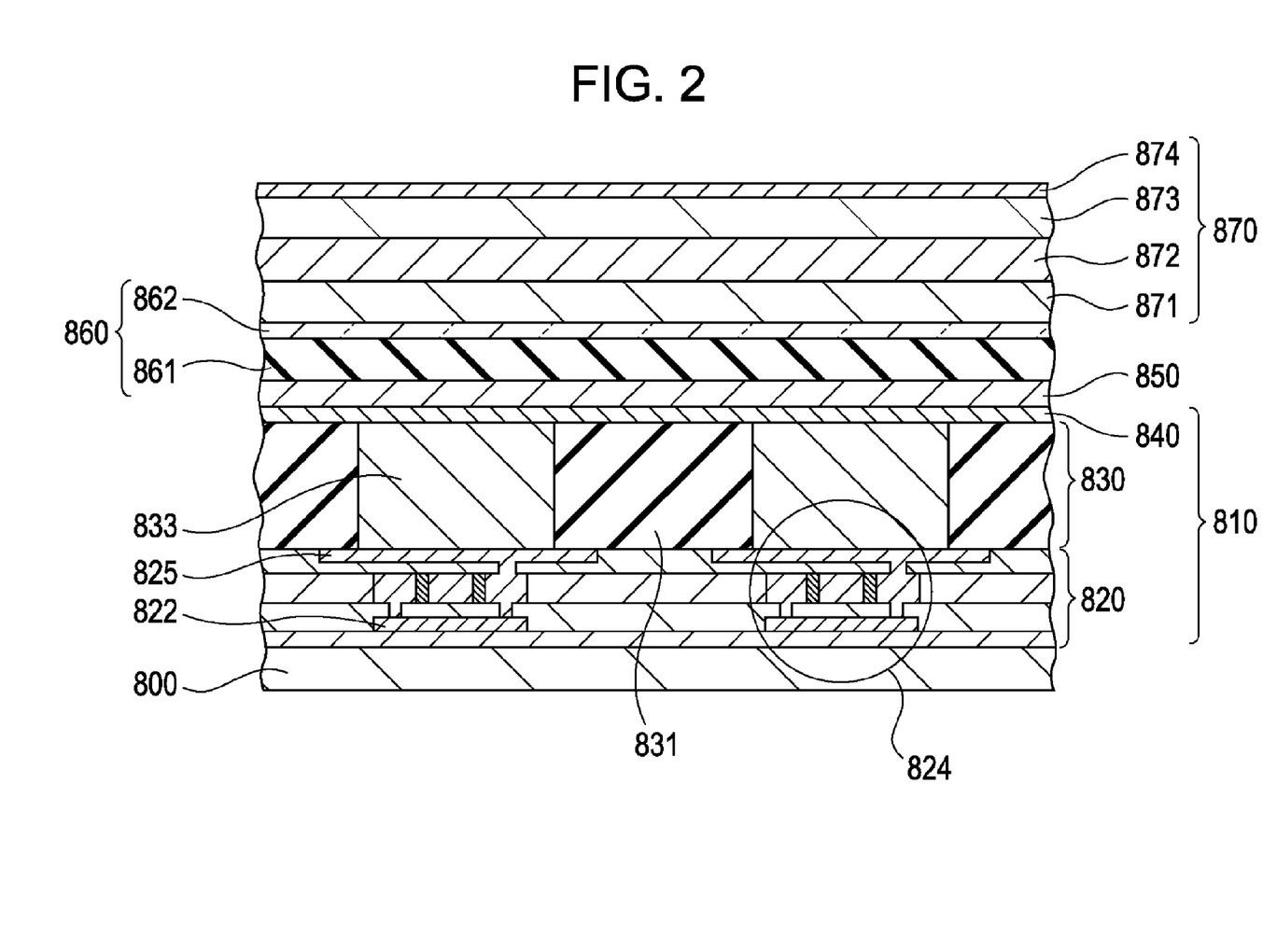
FIG. 2 is a sectional view illustrating a layer structure of a digital photosensitive drum according to the first exemplary embodiment of the present invention.

FIG. 2 is a sectional view illustrating the layer structure of the digital photosensitive drum according to the first exemplary embodiment. FIG. 2 represents a cross-section taken along a plane that contains a rotary shaft of the digital photosensitive drum and also contains one of scanning lines extending parallel to the rotary axis.

The layer structure includes a self-luminous device portion (exposure apparatus) 810, a function separating portion 860, and a photosensitive portion (photosensitive layer) 870, which are arranged in the named order in a radially outward direction from an outer peripheral surface of a drum cylinder 800 made of aluminum. Those functional portions will be described in detail below.

1. The self-luminous device portion 810 includes a TFT layer 820, a signal line layer 830, an EL light emitting layer 840, and a scanning line layer 850.

(1) The TFT layer 820 has a function of controlling a signal line 833. More specifically, the TFT layer 820 controls a gate 822 of a TFT circuit 824 and turns on/off the signal line 833. A source electrode of the TFT circuit 824 is connected to an electrode pad 825. A signal line control circuit is formed by transferring a circuit, which is formed on a glass substrate by the poly-Si process, onto the drum cylinder 800 by the device transfer process, and a driver for driving the TFT circuit 824 is formed on the same device.

(2) The signal line layer 830 includes an interlayer insulating film 831 and the signal line 833. The signal line 833 in the illustrated exemplary embodiment is formed as an Ag electrode with a width of 10 μm, which has an annular form extending around the drum. An interval between two adjacent signal lines 833 is about 42 μm (corresponding to pixel resolution of 600 dpi), and a total 5120 of signal lines (adapted for printing on an A4 sheet in portrait orientation) are arranged such that all axes of the annular signal lines are aligned with the rotary shaft of the drum.

(3) The EL light emitting layer 840 constitutes a charge-injected light emitting layer that emits fluorescence by organic EL. In the illustrated example, the signal line side serves a negative electrode formed of a metal electrode (Ag) and the scanning line side serves a positive electrode formed of a metal oxide (ITO). Therefore, the EL light emitting layer 840 has a four-layer structure formed by laminating an electron transport layer (ETL), a light emitting layer (EML), a hole transport layer (HTL), and a hole injection layer (HIL) in the named order from the signal line side.

(4) The scanning line layer 850 is formed of an ITO pattern electrode with a width of 10 μm and has a linear form extending over the peripheral surface of the drum. An interval between two adjacent scanning lines is about 42 μm (corresponding to pixel resolution of 600 dpi), and a total 8374 of scanning lines (corresponding to a φ-112 drum phase angle of 0.043°) are arranged in the scanning line layer 850 parallel to the rotary shaft of the drum. Each scanning line in the scanning line layer 850 is connected to a scanning-line driving circuit through a through-hole electrode (not shown).

2. The function separating portion 860 includes a transparent insulating/barrier layer 861 and a transparent conductive layer 862. The transparent insulating/barrier layer 861 is a multilayered film made of an organic polymer film and a metal oxide thin film ($Al_2O_3$). The transparent conductive layer 862 is formed by coating ITO over a surface (cylindrical outer peripheral surface) of the transparent insulating/barrier layer 861. With such a structure, the function separating portion 860 maintains transmittance of 85% for visible light ($\lambda$=520 nm) and high gas-barrier performance.

3. The photosensitive portion 870 is made of an organic photoconductor (OPC) formed by laminating an under coat layer (UCL) 871, a carrier generation layer (CGL) 872, a carrier transport layer (CTL) 873, and a protective layer 874 in sequence.

(Driving Method for Digital Photosensitive Drum)

Figure 4:
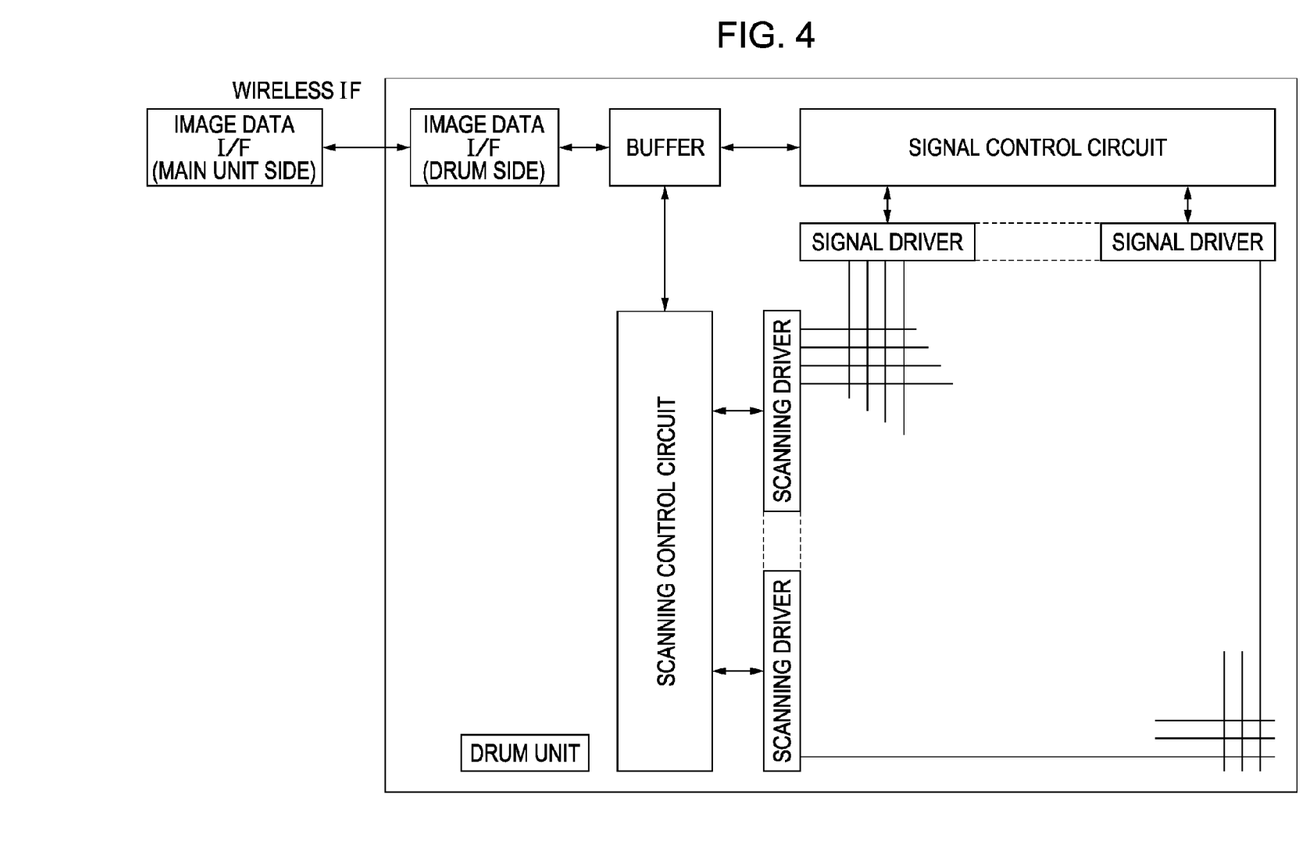
FIG. 4 is a block diagram illustrating a driving system for the digital photosensitive drum according to the first exemplary embodiment of the present invention.

FIG. 4 is a block diagram illustrating a driving system for the digital photosensitive drum according to the first exemplary embodiment of the present invention. In the first exemplary embodiment, light emitting pixels are driven by the active matrix (AM) method.

Specifications employed in the first exemplary embodiment are such that the number of scanning lines is 8374, the interval between the two adjacent scanning lines is about 42 μm (corresponding to pixel resolution of 600 dpi), the image forming speed is 120 mm/s, and the scanning lines are successively selected at a scanning cycle of about 352 μs (scanning frequency of 2.8 kHz).

Figure 5:
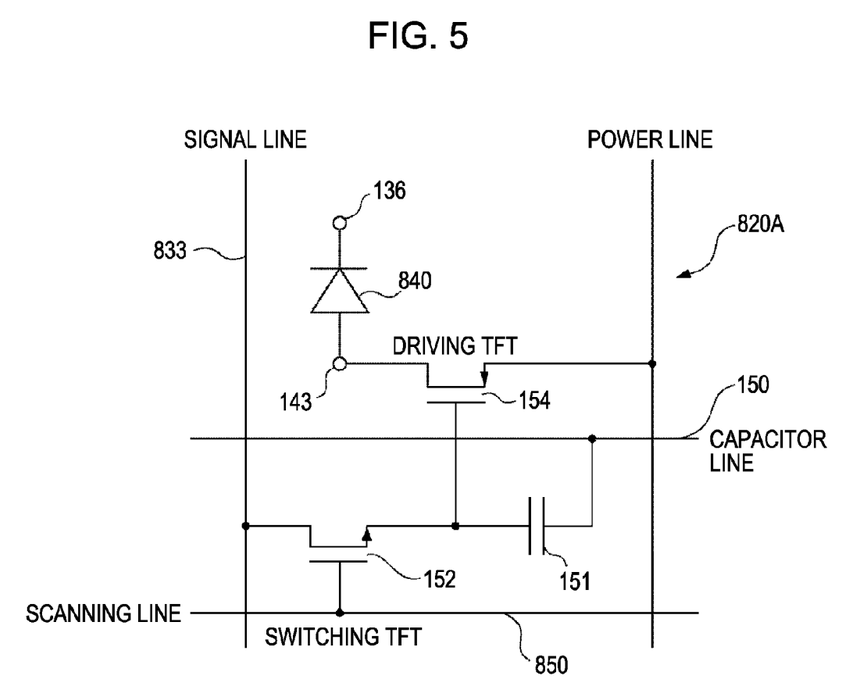
FIG. 5 is a diagram of an active matrix circuit according to the first exemplary embodiment of the present invention.

The TFT layer 820 is constituted by circuits 820A each illustrated in FIG. 5. The scanning line layer 850 serves as a layer for transmitting a signal sent from a scanning driver. Each signal line 833 serves as a line for transmitting a signal from a signal driver. By selecting a pixel to be energized to emit light based on coordinates (x, y), the desired pixel can be caused to emit light at a predetermined level of gradation. A capacitor line 150 serves to provide a reference potential for a capacitor 151, and the potential applied through the signal line 833 is accumulated in the capacitor 151. As illustrated in FIG. 4, each circuit 820A is controlled by a signal control circuit and a scanning control circuit. More specifically, the circuit 820A is constructed as follows. When a switching TFT 152 is turned on, the signal potential is accumulated in the capacitor 151 and a driving TFT 154 is turned on. Therefore, a potential difference is generated between a positive electrode 143 of the driving TFT 154 and a negative electrode layer 136, whereupon the EL light emitting layer 840 sandwiched between the positive electrode 143 and the negative electrode layer 136 emits light. With such a structure, light emitting portions are formed in a grid pattern in the organic EL layer.

Thus, the latent image can be formed with the organic EL by controlling the organic EL layer using the active matrix driving method so as to expose the digital photosensitive drum 203 from the inner side. While the exposure amount is determined depending on the exposure area, the sensitivity, and the exposure time of the digital photosensitive drum 203, the exposure amount is controlled depending on only the exposure time. In the first exemplary embodiment, the latent image is formed by switching the exposure time to be long or short depending on the density (shade) of an image to be formed.

(Control for Preventing White Spot and Edge Effect)

To prevent or at least mitigate the white spot and the edge effect, exposure control is performed in the first exemplary embodiment as described below.

In the first exemplary embodiment, since the organic EL generated inside the digital photosensitive drum is driven by the active matrix method, any desired pixel can be exposed after charging at an arbitrary time for an arbitrary period of time.

Figure 7:
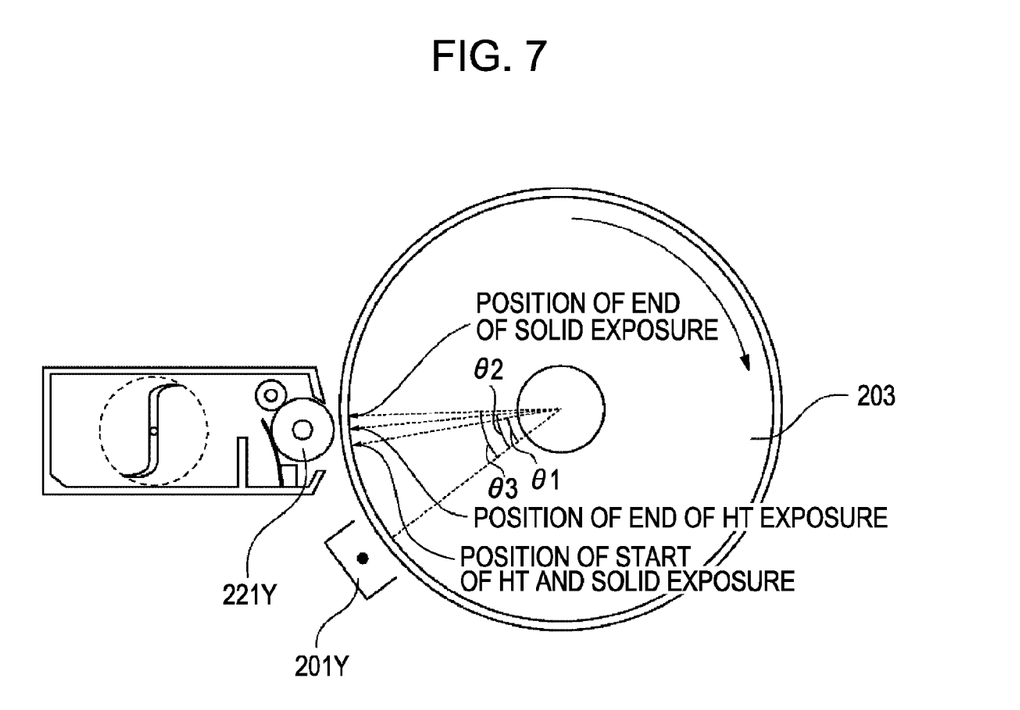
FIG. 7 is an explanatory view illustrating the positional relationship between a Y charger and a Y developing apparatus, along with exposure points, in the image forming apparatus according to the first exemplary embodiment of the present invention.

FIG. 7 is an explanatory view illustrating the positional relationship between the Y charger 201Y and the development roller 221 of the Y-developing apparatus, along with exposure points. Note that while a description is given of, by way of example, Y exposure, the following description is similarly applied to exposures for other colors.

The edge effect to be overcome by the exemplary embodiment of the present invention is generated at the end of a high-density image portion. The white spot and the edge effect are generated when the high-density image portion and a low-density image portion are adjacent to each other, such that the edge effect is generated at the end of the high-density image portion and the white spot is generated at the end of the low-density image portion. The exposure control is described below in connection with the case where the high-density image portion and the low-density image portion are adjacent to each other in the lengthwise direction of the digital photosensitive drum. Of course, even when the high-density image portion and the low-density image portion are adjacent to each other in the circumferential direction of the digital photosensitive drum, the generation of the edge effect and the white spot can be similarly suppressed by executing the exposure control described below. Further, even when the high-density image portion is present in a solid white ground, the edge effect generated at the end of the high-density image portion can be similarly suppressed by executing the exposure control described below.

When a solid black image portion as an example of the high-density image portion and a half-tone (HT) image portion as an example of the low-density image portion are exposed in the image forming apparatus according to the first exemplary embodiment, the exposure is started from the same position outside the development region, as shown in FIG. 7. Note that, in the first exemplary embodiment, the image density is controlled in accordance with the exposure time during which the light emitting device (self-luminous device portion) is turned on. Stated another way, when the latent image is formed in an area providing the high-density image portion, the exposure time is set to be long, and when the latent image is formed in an area providing the low-density image portion, the exposure time is set to be short. Because the image density is determined depending on the exposure time, luminance of the exposure is the same for both the HT image portion and the solid black image portion. When the digital photosensitive drum 203 is rotated and reaches a HT exposure end position shown in FIG. 7, the exposure for the HT image portion is brought to an end. The exposure for the solid black image portion is further continued and is brought to an end at a solid black exposure end position shown in FIG. 7. In the illustrated example, the exposure start position is set outside the development region, the HT exposure end position is set near the center of the development region, and the solid exposure end position is set to a point between the center and the end of the development region. As an alternative, the exposure start position can be set within the development region. Further, the HT exposure start position can be set before the development region, and the HT exposure end position can be set outside the development region (i.e., at a point prior to entering the development region).

Herein, the term "development region" means a region on the photosensitive drum where the toner flies from the development roller toward the photosensitive drum for the development of the latent image. More specifically, the development region is examined by a method of performing the development operation with the development roller 221 in a similar way to that in the actual image formation process while the digital photosensitive drum 203 and the development roller 221 are held in a stopped state. A region on the digital photosensitive drum 203 where the toner (developer) has adhered represents the development region.

The above-mentioned relationship among the exposure positions is now described in terms of angle. Assuming that a linear line extending from the center of the Y charger 201Y to the center of the digital photosensitive drum 203 is a reference, as shown in FIG. 7, an angle formed between the reference and a line extending from the HT and solid black exposure start position to the center of the digital photosensitive drum 203 is defined as θ1. Similarly, an angle formed between the reference and a line extending from the HT exposure end position to the center of the digital photosensitive drum 203 is defined as θ2, and an angle formed between the reference and a line extending from the solid black exposure end position to the center of the digital photosensitive drum 203 is defined as θ3. The relationship among θ1, θ2 and θ3 is expressed by θ3>θ2>θ1.

Figure 8:
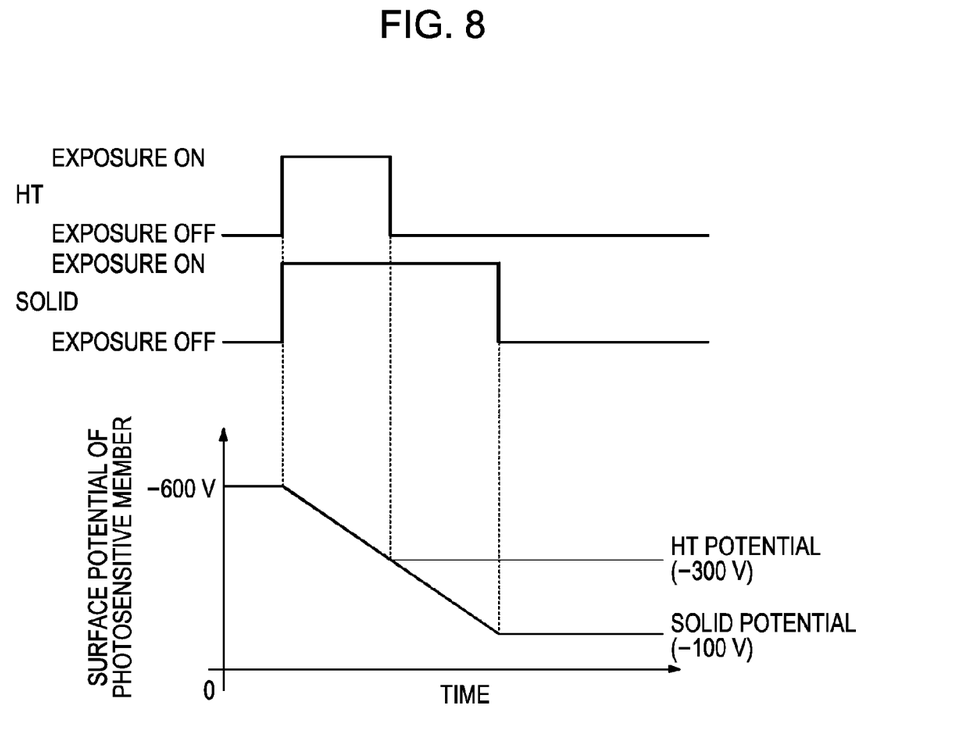
FIG. 8 illustrates a timing chart of exposure timing and corresponding changes in surface potential of the photosensitive member in the image forming apparatus according to the first exemplary embodiment of the present invention.

FIG. 8 is a time chart representing the exposure timing in the above-described process. Below the time chart in FIG. 8, corresponding changes in surface potential of the photosensitive member (drum) are illustrated. In other words, a position on the surface of the photosensitive drum corresponding to the high-density image portion at the timing when the exposure for the high-density image portion is completed is located downstream, in the moving direction of the surface of the photosensitive drum, of a position on the surface of the photosensitive drum corresponding to the low-density image portion at the timing when the exposure for the low-density image portion is completed. Also, a position where the exposure for the high-density image portion is completed is located within the development region.

Figure 13:
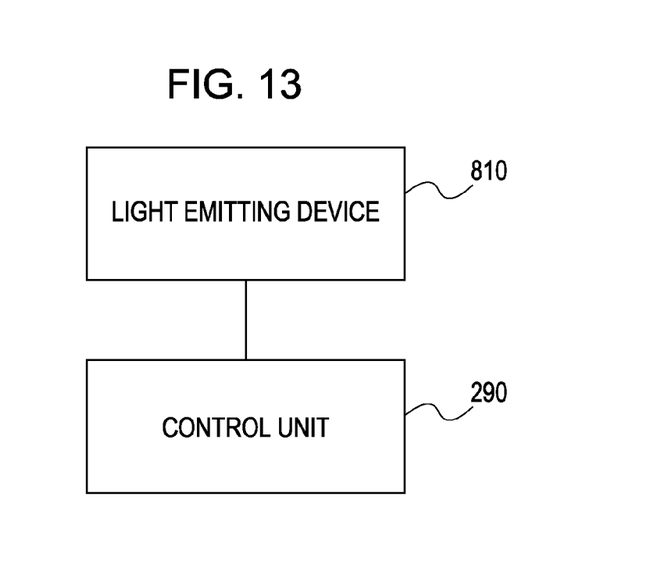
FIG. 13 is a block diagram illustrating the relationship between a control unit and an exposure apparatus in the embodiments of the present invention.

The above-described process is controlled by a control unit 290, shown in FIGS. 1 and 13, so that the self-luminous device portion (exposure apparatus) 810 is controlled as described above. Thus, since the HT image portion and the solid black image portion are at the same potential from the development start position to the center of the development region, a creeping electric field is not generated. Accordingly, the HT image portion and the solid black image portion are evenly developed. Thereafter, only the solid black image portion is exposed such that only the solid black image portion is additionally developed. At that time, since the toner has already been developed in the HT image portion adjacent to the solid black image portion, a creeping electric field is hardly generated. As a result, the development is performed without generating the white spot and the edge effect.

Thus, through the above-described control, the generation of the white spot and the edge effect can be reliably suppressed.

Second Exemplary Embodiment

Figure 9:
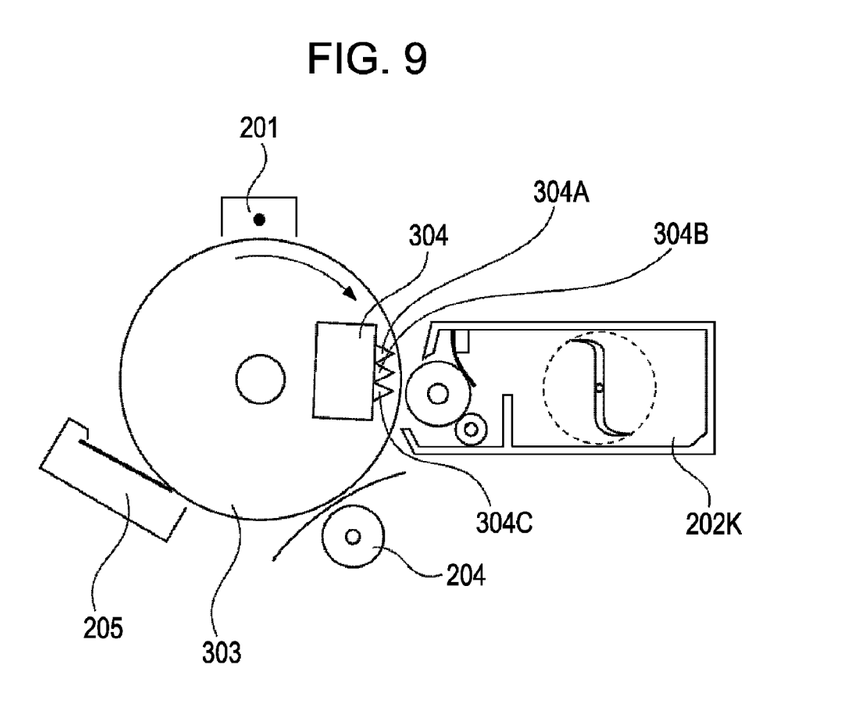
FIG. 9 is a schematic view illustrating principal components of an image forming apparatus according to a second exemplary embodiment of the present invention.

FIG. 9 is a schematic view illustrating principal components of an image forming apparatus according to a second exemplary embodiment of the present invention. The second exemplary embodiment represents a monochrome printer using only black toner. In the second exemplary embodiment, an LED array 304A (first exposure apparatus) is disposed upstream of the development region in the moving direction of the surface of a photosensitive drum 303, and LED arrays 304B and 304C (second exposure apparatus) are disposed so as to expose the development region from the backside (inner side) of the photosensitive drum 303. The photosensitive drum 303 is formed by coating a photosensitive layer over a transparent conductive base member such that the exposure can be made from the interior of the photosensitive drum.

The photosensitive drum 303 is steadily rotated in the direction indicated by an arrow and is uniformly charged by a charger 201. The uniformly charged photosensitive drum 303 is exposed in accordance with an image signal by an LED array unit 304 which is installed on the backside (inner side) of the photosensitive drum 303, thereby forming a latent image. The LED array unit 304 has a three-stage structure made up of the LED array 304A, the LED array 304B, and the LED array 304C, the latter two being disposed downstream of the LED array 304A in the rotating direction of the photosensitive drum 303. The photosensitive drum 303 is successively exposed by those three LED arrays. The latent image formed on the photosensitive drum 303 is visualized with adhesion of toner supplied from a one-component developing apparatus 202K. A toner image formed on the photosensitive drum 303 is transferred onto paper by a transfer apparatus 204 and is fused by a fusing apparatus (not shown) for fixing to the paper. The toner remaining on the photosensitive drum 303 after the transfer is scraped off by a cleaning apparatus 205. The printing process is thus completed.

Figure 10:
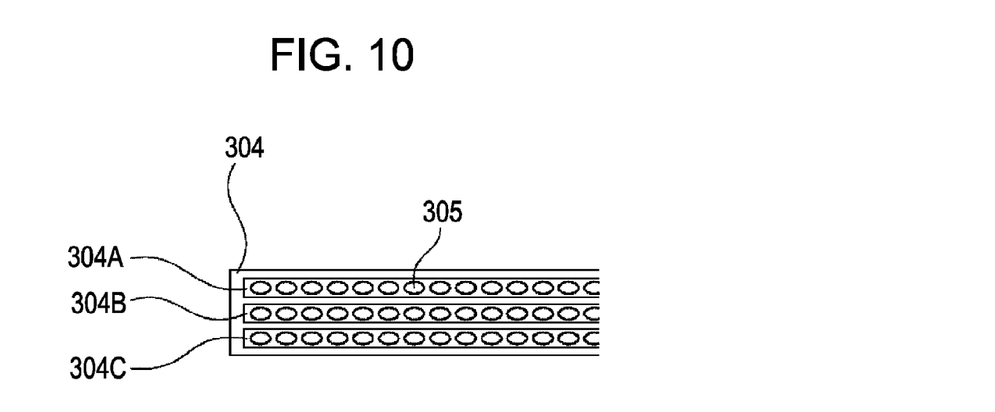
FIG. 10 is a detailed view of an LED array unit as one component of the image forming apparatus according to the second exemplary embodiment of the present invention.

FIG. 10 is a detailed view of the LED array unit 304. As illustrated in FIG. 10, the LED array unit 304 used in the second exemplary embodiment has a three-stage structure made up of the LED array 304A, the LED array 304B, and the LED array 304C, each LED array including LEDs (light emitting portions) 305. With such a three-stage structure, the same position on the image can be exposed three times at maximum. The LED array 304A is disposed before the development region (i.e., upstream of the development region in the moving direction of the surface of the photosensitive drum 303), and the LED array 304B is disposed in the first half of the development region. The LED array 304C is one of the three LED arrays, which is positioned on the side closest to the end of the exposure process, and it is disposed in the second half of the development region.

Figure 11:
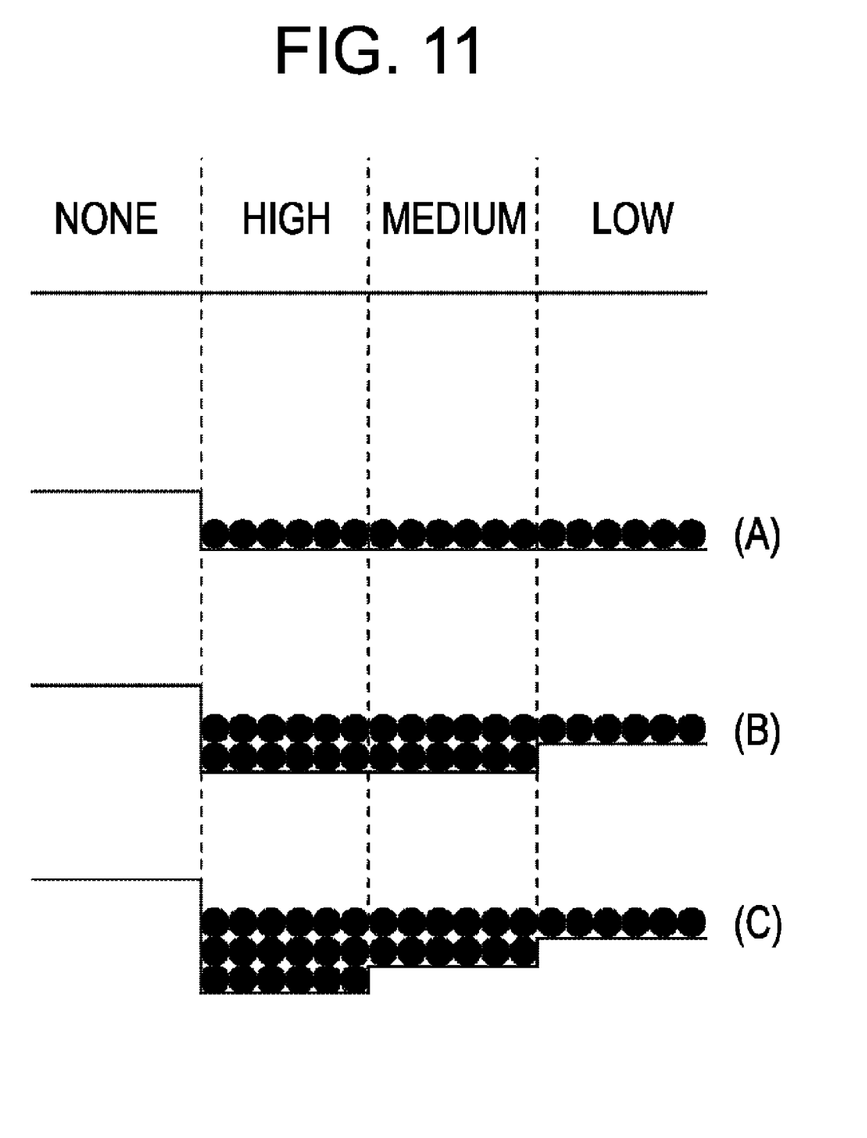
FIG. 11 illustrates potentials of a latent image on a photosensitive drum and the amount of deposited toner during development in the image forming apparatus according to the second exemplary embodiment of the present invention.

Based on the above-described construction, control is performed as follows in order to prevent or at least mitigate the white spot and the edge effect. The following description is given of exposure control executed when a high-density image portion, a medium-density image portion, and a low-density image portion are positioned adjacent to each other in the lengthwise direction of the photosensitive drum 303. FIG. 11 illustrates potentials of the latent image on the photosensitive drum 303 and the amount of deposited toner during the development. In FIG. 11, "high" means the high-density image portion, and "medium" means the medium-density image portion. Further, "low" means the low-density image portion, and "none" means a white ground portion.

1. (Step A)

First, the high-density image portion, the medium-density image portion, and the low-density image portion are all exposed by the LED array 304A disposed before the development region. When those image portions reach the development region, toner is supplied to adhere to those image portions for development of latent images therein, as illustrated at (A) in FIG. 11. In that development step, at the boundary between adjacent two of the high-density image portion, the medium-density image portion, and the low-density image portion, a potential difference is not generated and a creeping electric field is not caused. Accordingly, neither the white spot nor the edge effect is generated. Also, at the boundary between the high-density image portion and the white ground portion, a potential difference is so small that the edge effect is not generated.

2. (Step B)

Then, the high-density image portion and the medium-density image portion are additionally exposed by the LED array 304B disposed near the center of the development region. Such additional exposure attenuates the potential level only in the high-density image portion and the medium-density image portion. Therefore, the toner is supplied to additionally adhere to the high-density image portion and the medium-density image portion for further development, as illustrated at (B) in FIG. 11. At the boundary between the high-density image portion and the medium-density image portion, a potential difference is not generated. Accordingly, neither the edge effect nor the white spot is generated. Also, at the boundary between the medium-density image portion and the low-density image portion, the white spot is not generated because the toner has already adhered to the low-density image portion for the development. Further, at the boundary between the high-density image portion and the white ground portion, since the high-density image portion is charged to some extent by the toner having adhered thereto in (Step A) for the development, the creeping electric field is weak and the edge effect is not generated.

3. (Step C)

Then, only the high-density image portion is additionally exposed by the LED array 304C disposed in the second half of the development region. Such additional exposure attenuates the potential level only in the high-density image portion. Therefore, the toner is supplied to additionally adhere to only the high-density image portion for further development, as illustrated at (C) in FIG. 11. At this time, the high-density image portion is charged with the toner, which has been supplied for the development in (Step A) and (Step B), to substantially the same level as that in the medium-density image portion. Accordingly, at the boundary between the high-density image portion and the white ground portion, the creeping electric field is weak and the edge effect is not generated.

Thus, in the second exemplary embodiment, the same region on the photosensitive drum is exposed by the exposure apparatus plural times including the exposure within the development region. As a result, the development can be progressed in plural steps, whereby the generation of the edge effect and the white spot can be suppressed.

While the second exemplary embodiment has been described in connection with the case using, as the exposure apparatus, the LED array unit disposed on the backside (inner side) of the photosensitive drum 303, the second exemplary embodiment can also be applied to, instead of the LED array unit, the digital photosensitive drum including the light emitting device (self-luminous device portion) as described in the first exemplary embodiment. Even in the case using the digital photosensitive drum, it is also possible to suppress the generation of the edge effect and the white spot by exposing the same region on the digital photosensitive drum plural times with the light emitting device such that the development is progressed in plural steps.

Third Exemplary Embodiment

Figure 12:
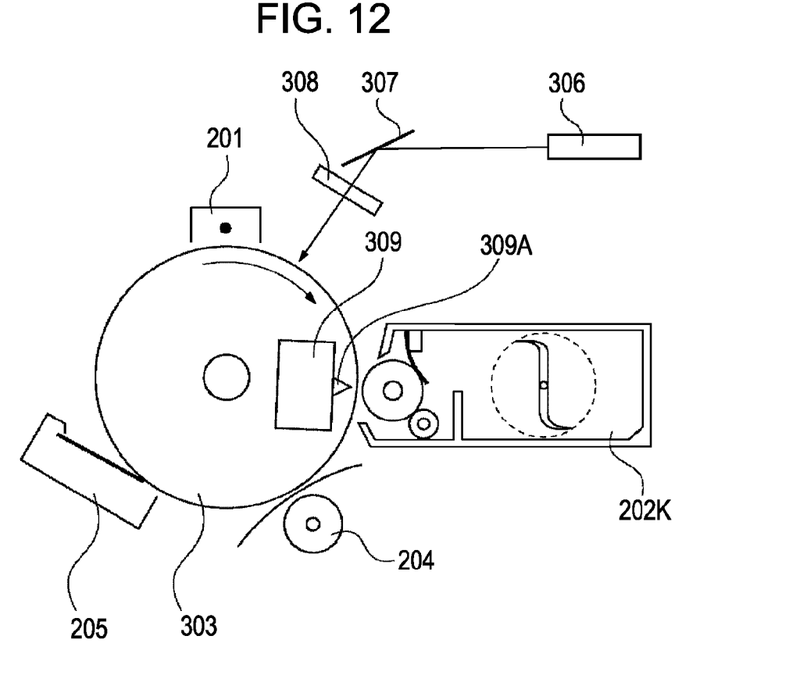
FIG. 12 is a schematic view illustrating principal components of an image forming apparatus according to a third exemplary embodiment of the present invention.

FIG. 12 is a schematic view illustrating principal components of an image forming apparatus according to a third exemplary embodiment of the present invention. The third exemplary embodiment represents a monochrome printer using only black toner. The third exemplary embodiment includes, as an exposure apparatus, a laser unit 306 (first exposure unit) that is disposed upstream of the development region in the moving direction of the surface of the photosensitive drum 303, and an LED array unit 309 (second exposure unit) that is disposed so as to expose the development region from the backside (inner side) of the photosensitive drum 303.

The photosensitive drum 303 formed by coating a photosensitive layer over a transparent conductive base member in the drum-like form is steadily rotated in the direction indicated by an arrow and is uniformly charged by a charger 201. The photosensitive drum 303 includes the photosensitive layer formed on the transparent conductive base member so that the exposure can be made from the LED array unit 309 disposed on the backside (inner side) of the photosensitive drum 303. The uniformly charged photosensitive drum 303 is exposed in accordance with an image signal by the laser unit 306, thereby forming a latent image. In the laser unit 306, a laser beam is scanned by a polygonal mirror 307 and is focused by a lens member 308. The latent image formed on the photosensitive drum 303 is developed by a one-component developing apparatus 202K with adhesion of toner supplied from the one-component developing apparatus 202K, while the photosensitive drum 303 is additionally exposed by an LED array 309A of the LED array unit 309 disposed on the backside (inner side) of the photosensitive drum 303. The LED array 309A is disposed near the center of the development region such that the latent image formed by the additional exposure can be additionally developed.

A toner image formed on the photosensitive drum 303 is transferred onto paper by a transfer apparatus 204 and is fused by a fusing apparatus (not shown) for fixing to the paper. The toner remaining on the photosensitive drum 303 after the transfer is scraped off by a cleaning apparatus 205. The printing process is thus completed.

According to the third exemplary embodiment thus constructed, since both the low-density image portion and the high-density image portion are exposed by the laser unit 306 and only the high-density image portion is additionally exposed by the LED array, the generation of the white spot and the edge effect can be reliably suppressed through the same mechanism as that in the second exemplary embodiment.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-044004 filed Feb. 23, 2007 and No. 2007-327408 filed Dec. 19, 2007, which are hereby incorporated by reference herein in their entirety.

What is claimed is:

1. An image forming apparatus comprising:

a photosensitive member having a movable surface, the photosensitive member including a photosensitive layer and an exposure apparatus which exposes the photosensitive layer to form an electrostatic latent image and includes light emitting portions arranged in a grid pattern, the photosensitive layer and the exposure apparatus being movable in union with the photosensitive member;

the exposure apparatus forming the electrostatic latent image by setting an exposure time to be long for an area forming a high-density image portion and short for an area forming a low-density image portion, a charging apparatus arranged to charge a surface of the photosensitive member;

a developing apparatus arranged to supply a developer to the electrostatic latent image in a development region, thereby developing the electrostatic latent image to a developer image; and a control unit configured to control the exposure apparatus such that, when a latent image is formed to obtain a developer image containing the high-density image portion and the low-density image portion, a position on the surface of the photosensitive member, at which exposure for the area forming the high-density image portion is completed, is located within the development region and downstream of a position on the surface of the photosensitive member, at which exposure for the area forming the low-density image portion is completed, in a moving direction of the surface of the photosensitive member.

* * * * *